A. C. ARNETT.

AUTOMOBILE LIGHT REFLECTOR.

APPLICATION FILED JULY 21, 1921.

Reissued Oct. 24, 1922.

15,473.

INVENTOR.

Albert C. Arnett

BY

J. E. Walker

ATTORNEY.

Reissued Oct. 24, 1922.

Re. 15,473

UNITED STATES PATENT OFFICE.

ALBERT C. ARNETT, OF SHILO SPRINGS, OHIO, ASSIGNOR OF ONE-HALF TO WILLIAM FINCH, OF DAYTON, OHIO.

AUTOMOBILE LIGHT REFLECTOR.

Original No. 1,361,354, dated December 7, 1920, Serial No. 358,423, filed February 13, 1920. Application for reissue filed July 21, 1921. Serial No. 486,617.

*To all whom it may concern:*

Be it known that I, ALBERT C. ARNETT, a citizen of the United States, residing at Shilo Springs, in the county of Montgomery, State of Ohio, have invented certain new and useful Improvements in Automobile Light Reflectors, of which the following is a specification.

This invention relates to new and useful improvements in head-lights such as are usually employed on automobiles.

The object of the invention is to provide means in a lamp or head-light of this character whereby the light is so controlled that the road or street ahead may be seen in front of the automobile, and the usual blinding glare due to the light being directed straight ahead from a reflected surface immediately surrounding the lamp, is eliminated, as will hereinafter more fully appear from the description to follow in connection with the accompanying drawings.

Figure 1:
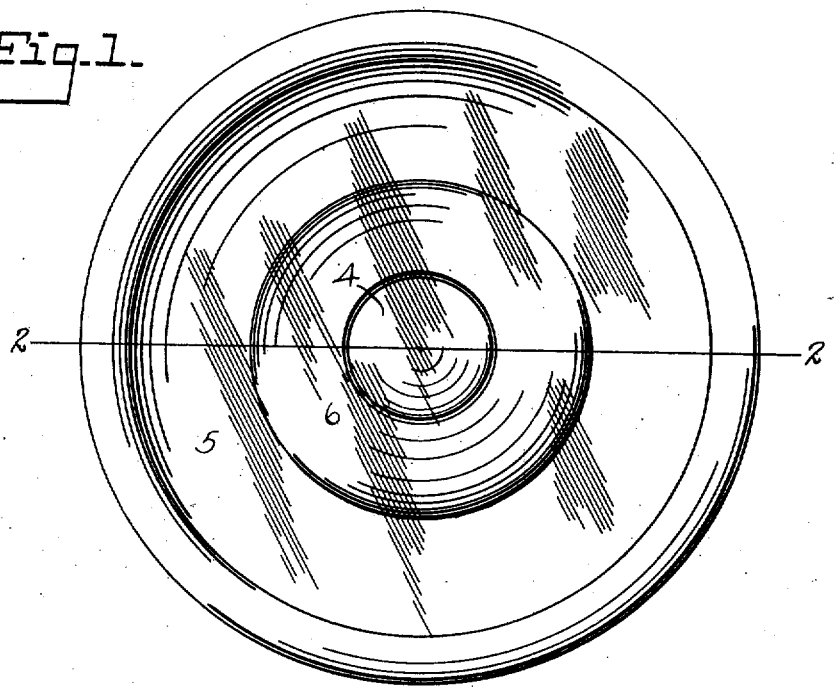
Figure 2:
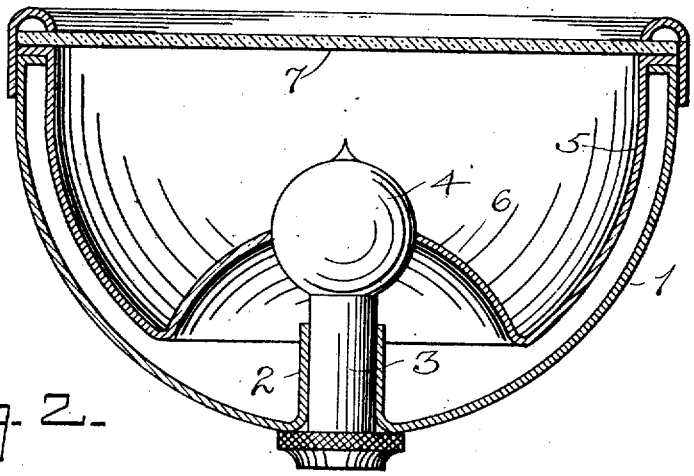

Figure 1 is a front elevation of an automobile lamp containing my improvement. Fig. 2 is a sectional view on line 2—2 of Fig. 1.

In a more specific description of the invention similar parts in the description and in the drawing are denoted by similar reference characters.

The light reflector as a whole is of the usual hollow shape and may be a spun or stamp structure. The usual protecting glass or lens 7 is supported in the front thereof. The rear wall 1 is extended in concave form and at the center thereof provides a socket 2 for the insertion of a plug 3 which supports the lamp or bulb 4 in a central position. The front wall 5 provides the light reflecting surface.

In the drawings the portion of the reflecting surface 5 immediately surrounding the lamp or bulb 4 is shown to be formed with a forward bulged or convex surface 6 which extends around the circumference of the lamp or bulb at approximately the center thereof and intercepts the rearwardly directed rays of the lamp. The non-reflecting surface 6 in area, is equal to substantially half the widest diameter of the reflecting surface 5. It will therefore be seen that the rays of light from the forward or exposed portion of the bulb or lamp will be thrown to the side reflecting surfaces 5, which are acutely divergent in relation with the axis of the lamp, from which surface the light is convergently thrown to the sides of the roadway or street, ahead of the automobile. It is to be understood that the surface 6 immediately surrounding the lamp bulb 4, need not necessarily be of rounded or concavo-convex form as shown, and the surface 5 may be more or less flaring. This form is merely adopted in the present case as being more ornamental or pleasing to the eye. The same results due to eliminating reflected light immediately from the rear of the lamp or bulb may be obtained by other forms of construction of the wall 6, whereby the light from the rear of the lamp or bulb 4 is intercepted, thus obscuring a substantially central area within the annular reflecting surface.

The blinding glare is due to the sight of the distorted image of the lamp in the mirror like surface opposed to or substantially transversely positioned in relation with the line of vision. The glare is eliminated by eliminating that portion of the reflecting surface upon which the distorted image of the lamp would be seen by an approaching person. The lamp requires no attention or adjustment by the driver neither increasing his duties nor detracting his attention.

Having described my invention I claim:

1. A light reflector having a non-reflecting wall in the central part thereof which extends across the interior of the reflector and reduces the reflecting surface thereof, and an incandescent lamp projected into an opening in said wall in a fixed position relative thereto, a portion of said lamp lying rearward of the wall whereby the rays from said rearward portion of said lamp is confined by said wall while the rays of the exposed part of the lamp is reflected by the reflecting surface.

2. A light reflector having a central part thereof extended in a stationary wall, an incandescent lamp mounted in an opening in the center of said wall in a fixed position, a portion of said lamp lying rearward of the wall, whereby the rays of light emitted from said lamp rearward of the wall is confined thereby, while the rays of light emitted from the part of said lamp lying forward of said wall is reflected by the reflecting surface of said reflector.

3. In a construction of the character described, an illuminator, a concave reflector having an annular reflecting surface concentrically arranged in spaced relation about the illuminator and in relation with which the illuminator is relatively fixed, said concave reflector being inwardly bulged at its apex, the illuminator being located within such bulged portion to such depth that a portion of the light rays will be intercepted by such bulged portion.

4. In a construction of the character described, a concave reflector having an integral protuberance at the apex thereof forming a fixed continuation of the reflector body, said protuberance having therein a chamber communicating with the chamber of the concave reflector, and an illuminator mounted in fixed relation with the reflector body and within the chamber of said protuberance at such depth that the extremity of the protuberance extends substantially into a plane common with the center of emanation of the light rays, whereby said light rays are permanently excluded from the central area of the reflector body and reflected from only the annular marginal surface thereof.

5. In a construction of the character described, a concave reflector, a lamp stationarily located within the reflector, the central portion of the reflector being bulged forwardly to form a concentrically disposed hollow protuberance projecting within the concavity of the reflector and surrounding and partially enclosing the lamp, and operating to permanently restrict the reflecting area of the reflector to an annular zone contiguous to the open face of such reflector.

6. A concave reflector adapted to be positioned adjacent to a relatively fixed source of light to reflect the rays thereof, having an integral inwardly protruding central portion surrounding and interposed between the source of light and reflector and comprising a permanent central non-reflecting area, said reflector having about said central area of non-reflecting power an annular portion of relatively high reflecting power.

ALBERT C. ARNETT.

Witnesses:

HENRY F. NOLAN,

F. L. WALKER.